Patented Nov. 14, 1944

2,362,472

UNITED STATES PATENT OFFICE 2,362,472

FUMIGANT MIXTURES

Robert R. Dreisbach and Fred W. Fletcher, Midland, Mich., assignors to The Dow Chemical Company, Midland, Mich., a corporation of Michigan No Drawing. Application June 1, 1942, Serial No. 445,392

3 Claims. (Cl. 167—39)

The present invention relates to new and improved fumigant mixtures and to a method for their use in controlling insect pests.

Many low boiling and volatile organic compounds have been suggested as fumigants, and carbon tetrachloride, methyl bromide, ethylene chloride, chloropicrin, and the like, are widely employed for the control of insect pests. Methyl bromide has been used as a grain fumigant, and for the fumigation of box cars and other rolling stock prior to loading with grain and other organic materials liable to infestation and contamination by parasites remaining in the cars from previous use. The increased demands being placed upon established transportation systems, however, require a more rapid fumigation procedure than is possible with unmodified methyl bromide. Furthermore, in the amounts required, methyl bromide is so innocuous as regards odor as to necessitate modification with lachrymators or other warning agents so as to minimize the danger to operators. Such warning agents may in themselves be objectionable either by reason of causing injury to fumigated materials or reacting with the fumigant.

It is among the objects of the present invention to provide a fumigant mixture comprising methyl bromide which will be more rapid in its action than methyl bromide itself, and have lachrymatory properties so as to preclude the necessity of adding warning agents thereto. A further object is to provide improved compositions which exert a toxicity against parasites in excess of that predictable from a knowledge of the effectiveness of the constituents. A still further object is to provide a method for the use of such compositions. Other objects of the invention will become apparent upon consideration of the following specification.

The present invention provides a fumigant mixture comprising a mixture of methyl bromide and methyl isopropenyl ketone as a major toxic ingredient. This mixture is faster in action and effective against a wider assortment of insect pests than are methyl bromide or methyl isopropenyl ketone alone. In the amounts required for the control of insect pests, such mixture has a pronounced lachrymatory property. The mixture irritates the eyes and mucous membranes to such an extent that human beings and higher animals can withstand its action for very short periods only. Such irritation appears to be cumulative and not to decrease by reason of fatigue of the organs affected. The combination of toxicants displays an effectiveness against common insect pests which is much greater than that predictable from a knowledge of the toxicity of the individual constituents.

In operating according to the present invention, any suitable proportions of the methyl bromide and methyl isopropenyl ketone may be mixed together. Compositions containing from about 5 to 95 per cent by weight of methyl bromide and the balance methyl isopropenyl ketone have been found particularly satisfactory. The properties of the resultant mixture vary with the exact proportions employed, but from about 0.25 to 1 pound or more of such mixture per 1000 cubic feet of space to be fumigated gives a rapid and high kill of insects generally. The amounts of the mixture used in any particular application are dependent upon the particular insect concerned, the looseness or tightness of the fumigation enclosure, the temperature, and the time of exposure.

The mixtures herein described are adapted to be employed in any of the accepted fumigation procedures. For example, they may be employed in household fumigation for the control of such common pests as cockroaches, mice, bedbugs, spiders, etc. They also may be employed for the fumigation of box cars and other common carriers to control mice, weevils, roaches, beetles, grain borers, mites and the like. Other uses to which the fumigant mixture is adapted include tent fumigation of growing trees and plants, greenhouse fumigation, bin fumigation of grain, seed fumigation, etc.

The compound methyl isopropenyl ketone embodies unsaturation of a type leading to the formation of semi-solid or solid polymerization products. While this tendency is not always encountered to an objectionable degree, it is sometimes desirable to incorporate into the liquid methyl isopropenyl ketone or mixture thereof with methyl bromide, a small proportion of a phenol and particularly of a polyhydroxy phenol such as hydroquinone, etc. The amount of such phenol employed is that required to serve as a stabilizer and is generally between about 0.001 and 0.1 per cent by weight. In the examples of the present application, the methyl isopropenyl ketone employed was modified with 0.01 per cent by weight of hydroquinone in order that inconsistencies resulting from the presence of traces of polymer might be avoided.

The following examples illustrate the invention but are not to be construed as limiting.

Example 1

Mixtures of methyl bromide and methyl isopropenyl ketone in varying proportions, both as regards the percentage composition of the original fumigant mixture and the amounts of mixture employed, were used as fumigants for the control of *Tribolium confusum*. The determinations were carried out at a constant temperature of approximately 25° C. and a relative humidity of 55 per cent ±5 per cent. The following results are representative of those obtained.

*Table*

| Methyl bromide conc. #/1,000 cu. ft. | Methyl isopropenyl ketone conc. #/1,000 cu. ft. | Percent mortality | |
|---|---|---|---|
| | | Exposure 5 hours | Exposure 16 hours |
| 0.6 | 0.1 | 100 | 100 |
| 0.5 | 0.1 | 100 | 100 |
| 0.25 | 0.1 | ---- | 100 |
| 0.2 | 0.1 | 20 | 95 |
| 0.175 | 0.1 | ---- | 99 |
| 0.15 | 0.1 | 0 | 88 |
| 0.125 | 0.1 | ---- | 62 |
| 0.25 | 0.25 | 98 | ---- |
| 0.2 | 0.2 | 84 | ---- |
| 0.125 | 0.125 | ---- | 98 |
| 0 | 0.25 | 3 | 43 |
| 0 | 0.2 | ---- | 11 |
| 0 | 0.125 | 2 | 4 |
| 0 | 0.1 | 0 | 2 |
| 0.6 | 0 | 62.5 | 100 |
| 0.5 | 0 | 12.5 | 100 |
| 0.25 | 0 | 0 | 7 |
| 0.2 | 0 | ---- | 6 |
| 0.125 | 0 | ---- | 2 |

From the foregoing it can be seen that the mixed fumigants were much speedier in action than methyl bromide alone, and that the kill of organisms obtained with the mixtures was greater than additive with respect to that accomplished with equivalent amounts of constituents.

Example 2

A further determination was carried out against *Tribolium confusum* with methyl bromide and methyl isopropenyl ketone in which the amounts required to give a 50 per cent kill (expressed as median lethal dose or M. L. D.) were determined for each fumigant. From these results a theoretical figure was obtained representing that amount which would be expected to accomplish 100 per cent kill of the test insects. The M. L. D. values of methyl bromide for 5 and 16 hour fumigations were found to be 0.55–0.6 and 0.25–0.3 pound per 1000 cubic feet, respectively. For methyl isopropenyl ketone in 5 and 16 hours exposures the M. L. D. values were found to be 0.4 and 0.25 pound per 1000 cubic feet, respectively. From these figures, it would be predicted that the amounts of a 50–50 mixture of these products which would be required to kill 100 per cent of the test organisms would be 0.95 and 0.55 pound per 1000 cubic feet at 5 and 16 hours' exposures, respectively. In actual practice it was found for the 50–50 mixture of fumigants (by weight) that 100 per cent kills were obtained at 5 and 16 hours' exposures with 0.5 and 0.3 pound per 1000 cubic feet, respectively. Obviously this result is much greater than additive.

In a similar manner mixtures of methyl bromide and methyl isopropenyl ketone may be employed as fumigants for the control of such parasites as bedbug, rice weevil, pea weevil, American cockroach, German cockroach, large milkweed bug, milkweed bug, *Cyaneus angustus*, Med. flour moth, lesser grain borer, etc.

In other modifications of the invention, the mixtures of methyl bromide with methyl isopropenyl ketone may be dissolved in less volatile carriers to obtain compositions adapted to be sprayed or otherwise applied to materials infested with insect pests. In such compositions, the active toxic principles are given up gradually over a period of time. Representative of the carriers which may be so employed are light petroleum distillates, white oils, ethylene chloride, carbon tetrachloride, propylene chloride, trichloroethylene, liquid halobenzenes, hydrogenated naphthalene, etc.

We claim:

1. A method for controlling insects and related parasites comprising the step of exposing such organism to the vapor of a fumigant composition comprising a mixture of methyl bromide and monomeric methyl isopropenyl ketone as the major toxic ingredient.

2. A fumigant composition comprising methyl bromide and monomeric methyl isopropenyl ketone.

3. A fumigant composition comprising from 5 to 95 per cent by weight of methyl bromide in mixture with monomeric methyl isopropenyl ketone.

ROBERT R. DREISBACH.
FRED W. FLETCHER.